March 14, 1967 L. C. BEARER ET AL 3,308,505
CENTRIPETAL EXTRUSION METHOD AND APPARATUS THEREFOR
Filed Sept. 16, 1963 2 Sheets-Sheet 1
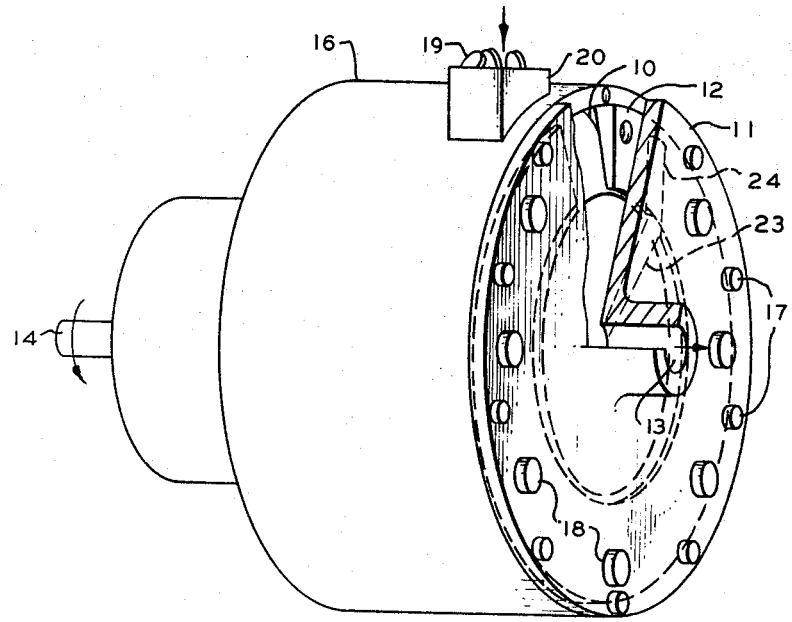
FIG. 1
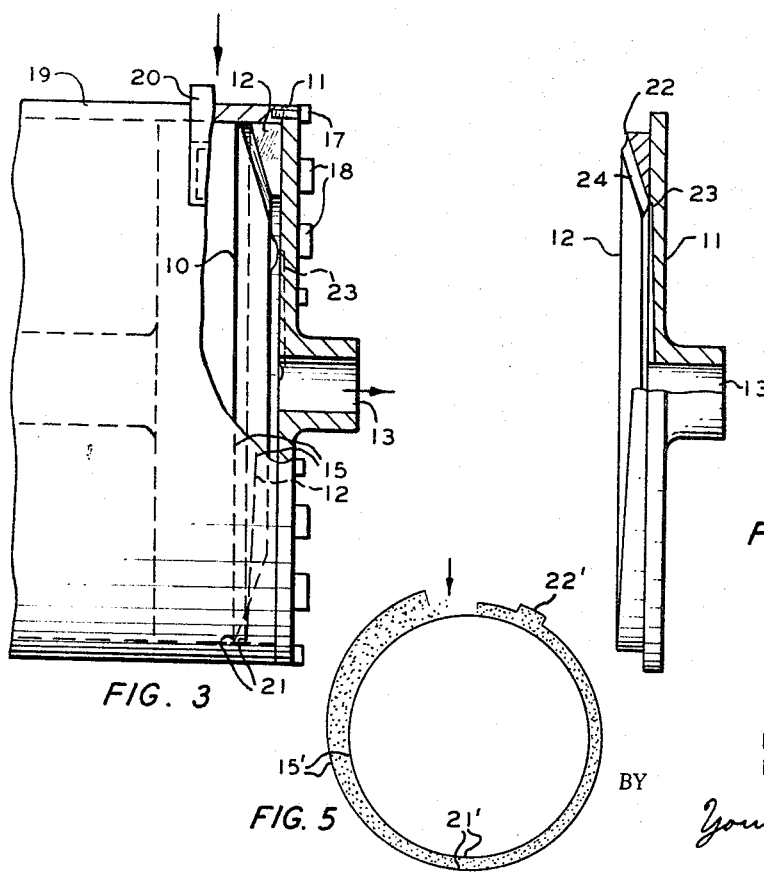
FIG. 3
FIG. 4
FIG. 5
INVENTORS
L. C. BEARER
M. M. BOWMAN, JR.
BY
Young & Quigg
ATTORNEYS March 14, 1967 L. C. BEARER ET AL 3,308,505
CENTRIPETAL EXTRUSION METHOD AND APPARATUS THEREFOR
Filed Sept. 16, 1963
2 Sheets-Sheet 2

INVENTORS
L.C. BEARER
M.M. BOWMAN, JR.
BY Young + Quigg
ATTORNEYS

United States Patent Office 3,308,505
Patented Mar. 14, 1967

3,308,505
CENTRIPETAL EXTRUSION METHOD AND
APPARATUS THEREFOR
Louis C. Bearer and Mark M. Bowman, Jr., Bartlesville, Okla., assignors to Phillips Petroleum Company, a corporation of Delaware
Filed Sept. 16, 1963, Ser. No. 309,091
6 Claims. (Cl. 18—12)

This invention relates to a centripetal extrusion method and apparatus therefor. In another aspect, this invention relates to the centripetal extrusion of visco-elastic materials wherein improved control of the movement of said visco-elastic materials through a centripetal extruder increases the throughput rate of the centripetal extruder and produces a more uniform extruded product material.

When a visco-elastic material is sheared between a rotating plate and a stationary plate, a force is developed perpendicular or normal to the shearing stress which tends to pull the visco-elastic material into the space between the rotating plate and the stationary plate, tending to force the rotating plate away from the stationary plate. Liquids and solutions which respond to shearing in an elastic as well as viscous manner produce this normal force effect. Those materials capable of producing, when in a liquid or melt state, this normal force will hereinafter be referred to as visco-elastic materials.

Centripetal extruders have been employed in the extrusion of visco-elastic materials, performing several operations simultaneously to include heating, mixing or compounding the materials, and forming a visco-elastic material into shapes by forcing it through a die. In the movement of the visco-elastic material through the conventionally operated centripetal extruder, the visco-elastic material has a tendency to build up in the feed channel, reducing the rate of throughput and detrimentally affecting the product quality of the extruded product material. A second problem associated with the operation of a conventional centripetal extruder results from a tendency of the partially extruded visco-elastic material feeding back into the inlet of the centripetal extruder.

Accordingly, an object of our invention is to provide an improved centripetal extruder.

Another object of our invention is to provide an improved centripetal extruder wherein the flow of visco-elastic material through the centripetal extruder is improved.

Another object of our invention is to provide a centripetal extruder wherein the feedback of partially extruded visco-elastic material is prevented.

Other objects, advantages and features of our invention will be readily apparent to those skilled in the art from the following description, drawings and appended claims.

A conventional centripetal extruder generally comprises two relatively moving plates in spaced, face-opposing relationship, one of which is provided with an extrusion orifice which customarily terminates in an extrusion die. These plates, conventionally operated as a rotor and a stator, are spaced so as to define an extrusion channel therebetween. For convenience, the extrusion channel and extrusion orifice together will hereinafter be referred to as the "extrusion path." Material suitable for extrusion by a centripetal extruder, for example, plastic material which is visco-elastic, or which may be rendered visco-elastic by the action of an extruder, is introduced near the periphery of the relatively moving plates and, in accordance with the phenomenon of centripetal pumping action, is caused to work inwardly through the extrusion channel, to build up pressure and to be forced by this pressure through the extrusion orifice and die.

The extruder can be fed with granular or particulate material, such as flakes, beads, powder and the like. The granular material is conventionally passed into a feeding orifice or hopper formed in the extruder's casing and falls or is drawn into the extrusion channel. Heating due to friction, working of particles and the addition of heat, causes the particles to soften, become tacky, and form a coherent, conglomerate, visco-elastic mass. As the mass is mechanically worked and drawn within the extrusion channel, it gradually plasticizes, becomes plastic and is extruded in that form.

We have discovered that the flow of a visco-elastic material through the extrusion path is improved by forming improved flow zones of (1) increasing shear and (2) substantially constant shear. We have further discovered that the flow of visco-elastic material through the extrusion path is improved by forming improved flow zones of (1) increasing shear followed by a zone of (2) substantially constant shear and a zone of (3) reduced shear. In forming the above zones, a continuous, smooth flow of visco-elastic material along the extrusion path is maintained, thereby preventing the build-up of visco-elastic material along the extrusion path. Shear can be defined as the progressive relative displacement of adjacent layers of material because of strain applied thereto.

A complete understanding of this invention can be obtained from the following detailed description of the drawings illustrating specific embodiments of the invention.

FIGURE 1 is an elevation, partially in cross section, of the inventive extruder.

FIGURE 3 is a second elevation, partially in cross section, of the inventive extruder.

FIGURE 4 illustrates the cooperation between the stationary plate and the convolute-shaped member.

FIGURE 5 illustrates schematically the three shear zones of the invention.

Figure 2:
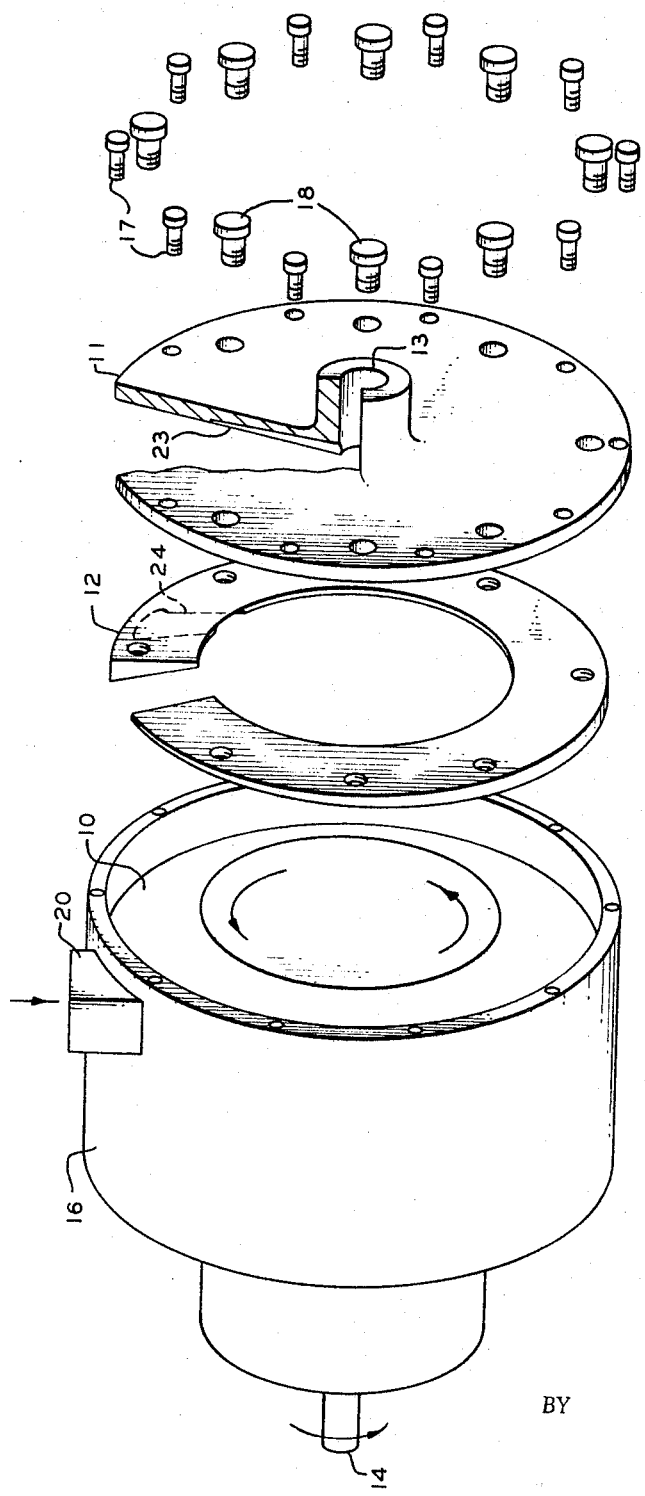
FIGURE 2 is an expanded elevation of the inventive centripetal extruder of FIGURE 1.

Referring to FIGURE 2, a centripetal extruder suitable for illustrating the invention can comprise a rotating beveled plate 10, a stationary plate 11, and a tapered-circular-shaped member 12 attached to stationary plate 11, defining narrow extrusion channel therebetween which extrusion channel terminates in an extrusion orifice 13 formed centrally in plate 11. The extrusion orifice can be provided with a suitable extrusion die not herein illustrated.

Rotating plate 10 is driven by a source of power not herein illustrated acting through a shaft 14 to rotate plate 10 in a counterclockwise direction relative to a stationary plate 11. Rotating plate 10 and tapered-circular-shaped member 12 are positioned within case 16 and stationary plate 11 is attached directly to case 16 via screw members 17. Convolute-shaped member 12 is attached to stationary plate 11 by means of screw members 18.

Referring to FIGURES 1, 3, 4 and 5, granular plastic material 19 is introduced into the centripetal extruder via inlet means 20 and passed or worked counterclockwise by the rotation of plate 10 along the extrusion path defined by tapered-circular-shaped member 12 and plate member 10. FIGURE 5 illustrates that the extrusion path becomes increasingly restrictive as the feed material moves counterclockwise, thereby providing a zone of increasing shear. The numeral 15 of FIGURE 3 designates the position or zone along the extrusion path corresponding to 15′ of FIGURE 5. The plastic material is worked by the relative movement of plate 10 and the convolute-shaped member 12, heated by such working and the addition of other heat not herein illustrated, and softens and becomes tacky. Further working and heating in the extrusion path causes the particles to plasticize.

When the plastic material arrives at the zone designated as numeral 21 in FIGURE 3 and 21′ in FIGURE 5, the material enters a zone of substantially constant shear, continuing to move counterclockwise through the circular extrusion path. The zone of constant shear, wherein the cross-sectional area of the extrusion path is substantially constant, extends counterclockwise from 21′ to 22′. Although as illustrated the zone of substantially constant shear begins about 180° from inlet 20, it is within the scope of this invention to move the zone of constant shear nearer to or further from the inlet 20.

The cross-sectional area of the extrusion path is increased at 22′ (22 in FIGURE 4) to provide a zone of reduced shear. The elastic material flows into channel 24 and from channel 24 into channel 23, and from channel 23 to the outlet 13. Channel 24 is provided in tapered-circular-shaped member 12 and is connected with a recessed channel in plate member 11. By providing the described zone of reduced shear, wherein the cross-sectional area of the extrusion path is increased, the elastic material will not continue to flow counterclockwise to inlet 20 and from the extruder via inlet 20. We have thus provided a circular-shaped extrusion path having zones of increasing shear, substantially constant shear, and reduced shear.

Referring to FIGURE 3, it can be seen that the relative positioning of rotating plate 10, tapered-circular-shaped member 12 and stationary plate 11 have defined a continuous, smooth extrusion path, eliminating or reducing to a minimum "dead spots" wherein the flow of the elastic material is interrupted. Thus, we have provided for increased throughput and for a more uniform extruded product material.

Although the invention as described has a rotating plate member 10, it is also within the scope of this invention to hold plate member 10 stationary and rotate plate member 11 and tapered-circular-shaped member 12. Under these conditions, plate member 11 would not, of course, be attached in fixed relationship to case 16. As in the case of rotating plate 10, the rotation of plate member 11 will produce the previously described zones of increasing shear, substantially constant shear, and reduced shear.

*Example*

An ethylene copolymer having a density of .95 and a melt index of 0.3 is passed in pellet form to the visco-mill of FIGURE 1 and FIGURE 2. Carbon black is mixed with the copolymer so as to provide a combined feed mixture having a concentration of 3 weight percent carbon black.

An extruded product is obtained having a dispersion rating (method of determining product quality) of A. The dispersion rating was determined by comparison with standard samples graded as follows:

A—Excellent
B—Good
C—Acceptable
D—Not acceptable
E—Poor

The product obtained is compared with the product obtained in a second run using the same visco-mill feed as above. In this second run, the visco-mill did not contain the convolute-shaped member nor was the stationary member recessed. The product obtained from this second run has a product dispersion rating of D.

Comparison of throughput rates obtained in the first run and second run show that the first run has a throughput rate of 60 lbs./hr. and the second run has a throughput rate of 51 lbs./hr. This represents an increase of 17.7 weight percent.

Various modifications of this invention can be made, or followed, in view of the foregoing disclosure, without departing from the spirit or scope thereof.

We claim:
1. An extrusion apparatus comprising
   (a) a case member having an opening therein,
   (b) a rotatable plate member having a substantially planar surface,
   (c) a stationary plate member having a substantially planar surface fixedly attached to said case member and positioned in front of said opening, said stationary plate member having an extrusion orifice in a portion thereof, the planar surface of said stationary plate member being parallel to and closely spaced from said rotatable plate planar surface, thereby defining an extrusion channel, the spacing between said parallel plates being sufficient to cause visco-elastic extrusion of plastic materials from the periphery of said plates through said extrusion orifice by relative rotation of said parallel plates about an axis passing through said extrusion orifice and substantially perpendicular to said plates at that point,
   (d) means for introducing into said space between said parallel surfaces a plastic material, said introducing means including a feed channel formed by a slanting surface on said rotatable member circumscribing said planar surface on said rotatable member, said slanting surface being inclined away from said stationary plate member planar surface at an oblique angle thereto,
   (e) said introducing means also including a second orifice in said casing connected to said feed channel at a first point,
   (f) means in said feed channel to taper the thickness of said feed channel between said fixed plate planar surface and said slanting surface from said first point to a second point in said feed channel spaced a substantial distance from said first point, said means in said feed channel maintaining the thickness of said feed channel constant from said second point to a third point in said feed channel spaced farther around said rotatable member planar surface to thereby define sections in said feed channel of increasing shear and constant shear.

2. An extrusion apparatus according to claim 1 wherein said tapering means is a circular-shaped member having a tapered thickness from said first point to said second point and a constant thickness from said second point to said third point.

3. An extrusion apparatus according to claim 1 wherein there is provided at said third point a radial channel extending from said feed channel inwardly toward said extrusion orifice to a space between said parallel surfaces, thereby defining a section in said feed channel of reduced shear stress.

4. An extrusion apparatus according to claim 2 wherein there is further provided in said circular-shaped member a radial section of reduced thickness at said third point extending to said space between said parallel surfaces to form a channel in said circular-shaped member.

5. The apparatus of claim 2 wherein said circular-shaped member is attached to said stationary plate member.

6. The apparatus of claim 2 to include a second channel positioned within said stationary member communicating between said channel positioned within said circular-shaped member and said outlet.

References Cited by the Examiner

UNITED STATES PATENTS

| | | | |
|---|---|---|---|
| 2,702,410 | 2/1955 | Brown | 264—176 |
| 2,977,632 | 4/1961 | Bunch | 18—12 X |
| 3,032,814 | 5/1962 | Miner | 18—12 |
| 3,068,517 | 12/1962 | Blackmore | 18—12 X |
| 3,079,365 | 3/1963 | Adams | 18—12 X |
| 3,123,861 | 3/1964 | Westover | 18—12 |
| 3,125,620 | 3/1964 | Skinner | 264—176 |
| 3,153,686 | 10/1964 | Adams | 18—12 X |

WILLIAM J. STEPHENSON, *Primary Examiner.*